(12) United States Patent
Yilmaz

(10) Patent No.: US 9,367,086 B2
(45) Date of Patent: Jun. 14, 2016

(54) SMART WATCH WITH ADAPTIVE TOUCH SCREEN

(71) Applicant: Esat Yilmaz, Santa Cruz, CA (US)

(72) Inventor: Esat Yilmaz, Santa Cruz, CA (US)

(73) Assignee: Atmel Corporation, San Jose, CA (US)

( * ) Notice: Subject to any disclaimer, the term of this patent is extended or adjusted under 35 U.S.C. 154(b) by 93 days.

(21) Appl. No.: 14/102,259

(22) Filed: Dec. 10, 2013

(65) Prior Publication Data
US 2015/0160621 A1 Jun. 11, 2015

(51) Int. Cl.
| | | |
|---|---|---|
| G06F 1/16 | (2006.01) | |
| G04G 21/08 | (2010.01) | |
| G06F 3/044 | (2006.01) | |
| G06F 3/0346 | (2013.01) | |
| G04G 21/02 | (2010.01) | |
| G04G 9/00 | (2006.01) | |
| G06F 3/03 | (2006.01) | |
| G06F 3/0488 | (2013.01) | |

(52) U.S. Cl.
CPC .............. *G06F 1/163* (2013.01); *G04G 9/0064* (2013.01); *G04G 21/02* (2013.01); *G04G 21/08* (2013.01); *G06F 1/1643* (2013.01); *G06F 1/1652* (2013.01); *G06F 1/1694* (2013.01); *G06F 3/0304* (2013.01); *G06F 3/044* (2013.01); *G06F 3/0488* (2013.01); *G06F 2203/04102* (2013.01)

(58) Field of Classification Search
CPC . G06F 3/0488; G06F 3/0487; G06F 3/04845; G06F 2200/1614; G06F 2200/1637; G06F 1/1652; G06F 1/1694; G06F 1/1643; G06F 1/163; G06F 3/044; G06F 3/0304; G06F 2203/04102; G09G 2354/00; G09G 2340/0492; G09G 2340/0464; H04N 9/3185; H04N 9/317; G04G 9/0064; G04G 21/08; G04G 21/02
USPC .................................................. 345/173, 659
See application file for complete search history.

(56) References Cited

U.S. PATENT DOCUMENTS

| | | | |
|---|---|---|---|
| 7,663,607 | B2 | 2/2010 | Hotelling |
| 7,864,503 | B2 | 1/2011 | Chang |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 8,217,902 | B2 | 7/2012 | Chang |

(Continued)

FOREIGN PATENT DOCUMENTS

WO 2012129247 9/2012

OTHER PUBLICATIONS

U.S. Appl. No. 61/454,936, filed Mar. 21, 2011, Myers.

(Continued)

*Primary Examiner* — Julie Anne Watko
(74) *Attorney, Agent, or Firm* — Baker Botts L.L.P.

(57) ABSTRACT

In one embodiment, a system includes a display, a position sensor configured to determine a relative orientation of the display, and computer-readable storage media embodying logic that is configured when executed to display first information at a first position of the display, determine a change in orientation of the display, determine a second position to display the first information in response to the change in orientation of the display, and display the first information at the determined second position.

13 Claims, 6 Drawing Sheets

(56) References Cited

U.S. PATENT DOCUMENTS

| | | | |
|---|---|---|---|
| 8,358,321 B1* | 1/2013 | Weidner | 345/659 |
| 8,502,788 B2* | 8/2013 | Cho | 345/173 |
| 8,723,824 B2 | 5/2014 | Myers et al. | |
| 2008/0309635 A1 | 12/2008 | Matsuo | |
| 2009/0265627 A1* | 10/2009 | Kim | G06F 1/1626 715/702 |
| 2009/0315854 A1 | 12/2009 | Matsuo | |
| 2010/0029327 A1* | 2/2010 | Jee | 455/556.1 |
| 2010/0079485 A1* | 4/2010 | Bentley | 345/619 |
| 2010/0125816 A1* | 5/2010 | Bezos | G06F 1/1626 715/863 |
| 2011/0187681 A1* | 8/2011 | Kim et al. | 345/204 |
| 2012/0162214 A1* | 6/2012 | Chavez | G06F 3/012 345/419 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1* | 3/2013 | Myers | 345/156 |
| 2014/0049487 A1* | 2/2014 | Konertz et al. | 345/173 |
| 2014/0062860 A1* | 3/2014 | Lee et al. | 345/156 |
| 2015/0003210 A1* | 1/2015 | Joung et al. | 368/10 |
| 2015/0049591 A1* | 2/2015 | Adams et al. | 368/13 |
| 2015/0055821 A1* | 2/2015 | Fotland | G06K 9/00221 382/103 |
| 2015/0085621 A1* | 3/2015 | Hong et al. | 368/10 |

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

US 9,367,086 B2

SMART WATCH WITH ADAPTIVE TOUCH SCREEN

TECHNICAL FIELD

This disclosure generally relates to a smart watch device, and more particularly to a smart watch device with an adaptive touch screen.

BACKGROUND

Current smart watch designs feature static faces (i.e., the portion of the watch that displays time information, date information, and/or other information). Thus, when the smart watch is worn by a user, the orientation of the face is always in the same position. This can prove inconvenient when performing certain tasks that involve the use of the users hands, such as driving a car or typing on a keyboard, since the user wearing such a watch would need to orient his or her wrist in such a way that the face is oriented toward their eyes. Doing this may lead to lower productivity and/or unnecessary distractions when performing these tasks.

DESCRIPTION OF EXAMPLE EMBODIMENTS

FIGS. 1A-1D illustrate an example smart watch 100 according to embodiments of the present disclosure. Current smart watch designs feature static faces (i.e., the portion of the watch that displays time information, date information, and/or other information). Thus, when the smart watch is worn by a user, the orientation of the face is always in the same position. This can prove inconvenient when performing certain tasks that involve the use of the users hands, such as driving a car or typing on a keyboard, since the user wearing such a watch would need to orient his or her wrist in such a way that the face is oriented toward their eyes. Doing this may lead to lower productivity and/or unnecessary distractions when performing these tasks.

Accordingly, one aspect of the present disclosure contemplates a smart watch with an adaptive face that positions itself on the watch in such a way that creates the optimal view for the user of the watch without requiring the user to re-orient his or her wrist. Considering the example of a user driving a car, to view a conventional watch or current smart watch design, the user would need to orient the wrist in a way that allows the user to see the watch face, which could involve the user removing a hand from the steering wheel of the vehicle. This effort is both unnecessary and dangerous as it may cause distractions to the user while driving. A user of a smart watch according to the present disclosure would not need to move their wrist of take their hand off the steering wheel. Instead, the user would simply need to glance down at the smart watch since the smart watch would have adapted the location of the displayed face according to the user's relative wrist and/or eye position. In this way, a user of a smart watch according to the present disclosure can avoid the unnecessary or even dangerous re-orientation of their wrist.

Figure 1A:
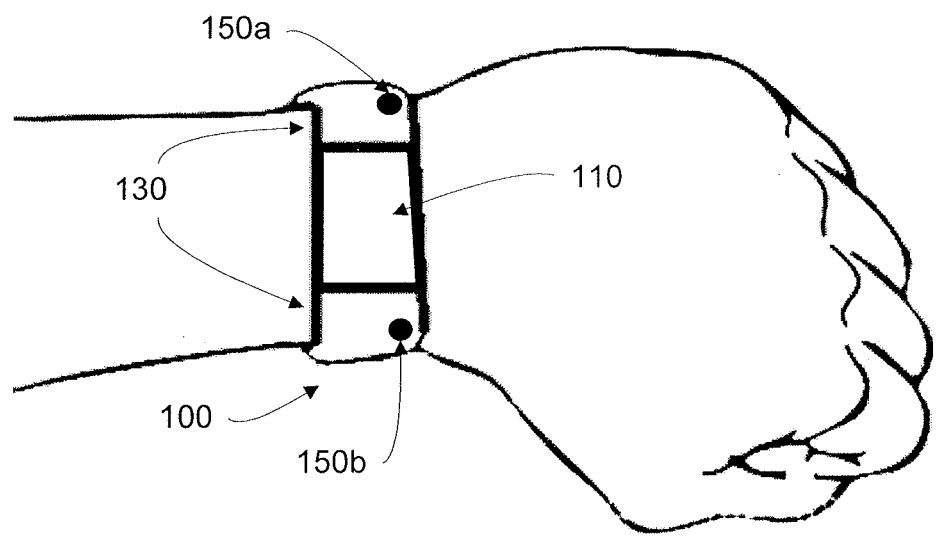
FIGS. 1A-1D illustrate an example smart watch according to embodiments of the present disclosure.
Figure 1B:
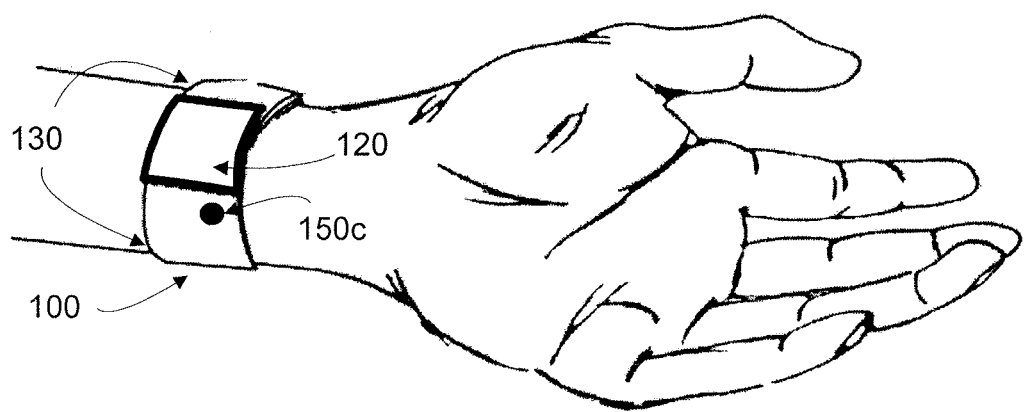
Figure 1C:
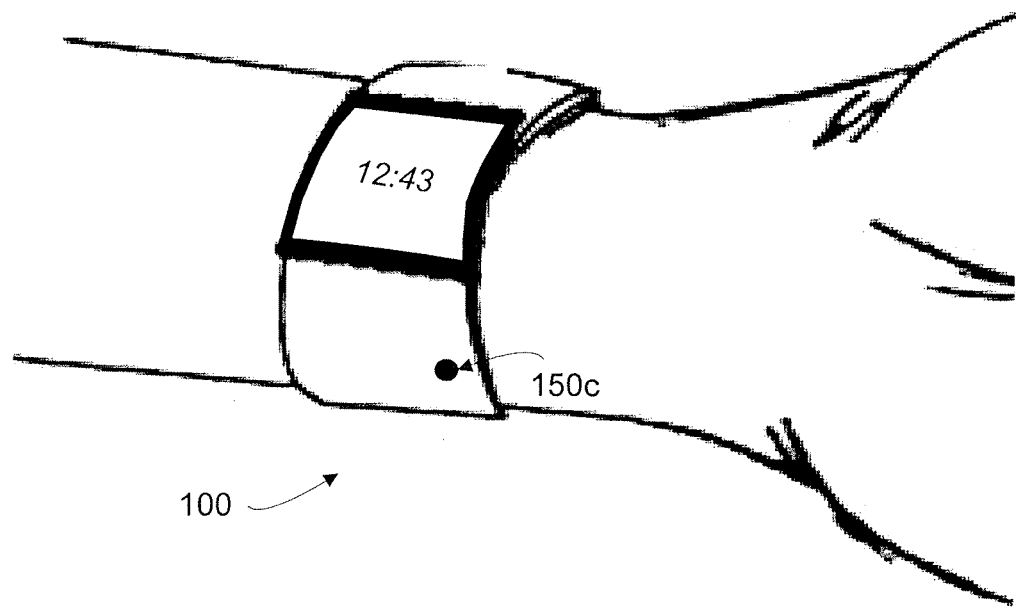
Figure 1D:
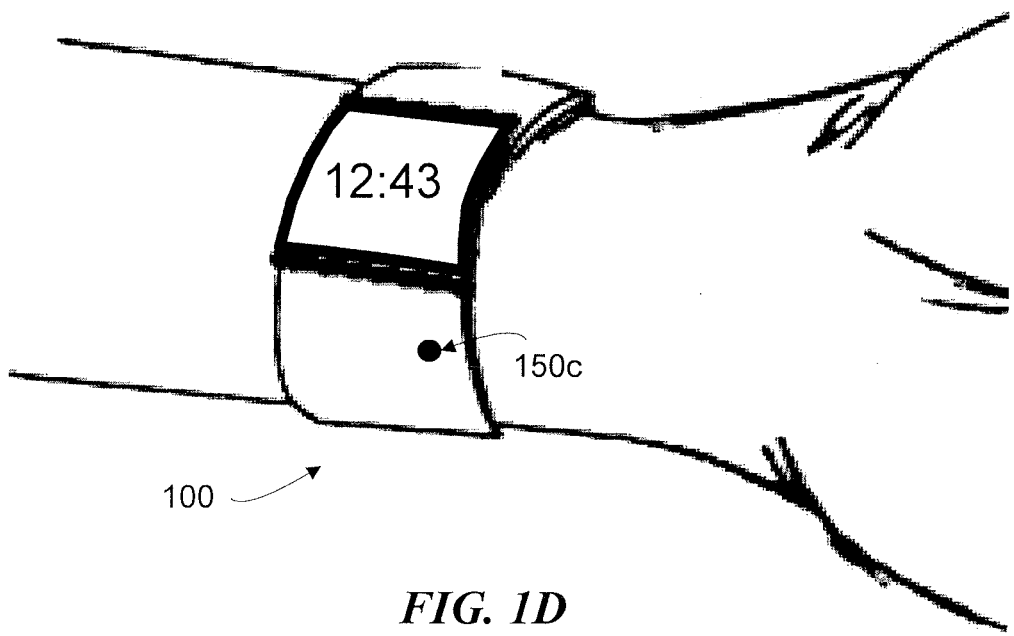

Smart watch 100 may include a display that covers all or a substantial portion of the surface of the device. The display may be configured to display first information at a particular position on the display of smart watch 100 as shown in FIGS. 1A-1B. First information may include any suitable information for display at first position 110, and in particular embodiments, may include information that is typically included on the face of a watch, such as time information (e.g., "12:00 PM"), day information (e.g., "Wed."), or date information (e.g., "Jan. 1, 2014"). As the orientation of smart watch 100 is changed (such as when the user moves his or her wrist), smart watch 100 may determine the relative change in orientation using, for example, a position sensor and alter the position on the display where the first information is displayed. For instance, when a user alters the orientation of the watch from that shown in FIG. 1A to that shown in FIG. 1B, smart watch 100 may be able to display the first information at position 120 as shown in FIG. 1B rather than position 110 shown in FIG. 1A. If the user were to re-orient smart watch 100 to the position shown in FIG. 1A, smart watch 100 may be configured to then display the first information at position 110 shown in FIG. 1A rather than position 120 shown in FIG. 1B. Although first information is shown at two positions 110 and 120 in FIGS. 1A-1B, the first information may be displayed at any suitable location on the display of smart watch 100 based on the relative orientation of smart watch 100.

In particular embodiments, the display of smart watch 100 may be configured to display second information in addition to first information. Second information may include any suitable information for display at a position on the display that is different from the position on the display at which the first information is being displayed. For example, first information may include time information, while second information may include day, date, and weather information. In this example, the first information may be displayed at positions 110 and 120 in FIGS. 1A-1B, respectively, at the relative orientations shown, while second information may be located at any suitable location within positions 130 shown in FIGS. 1A-1B (e.g., at a location on the display where first information is not being displayed). In certain embodiments, second information may simply include an image. For example, smart watch 100 may be configured to display an image of a watch strap or bracelet at positions 130 while first information is displayed at positions 110 and 120 of FIGS. 1A-1B. Alternatively, smart watch 100 may be configured to display nothing in positions 130 while first information is displayed at positions 110 and 120 of FIGS. 1A-1B. It will be understood that smart watch 100 is configured to display the second information at different positions in response to changes in orientation just as with the changes in position of first information in response to changes in orientation. Accordingly, if smart watch 100 determines that the optimal position to display first information is at a position where second information is currently being displayed, smart watch 100 will display the first information at the determined location (i.e., where the second information was previously being displayed), and will move the second information to a different position to accommodate the new position of first information on the display.

In particular embodiments, the first and/or second information may include objects such as icons that are operable to display other types of information (e.g., a cloud or sun for weather information) and/or objects that are operable to start an application on the smart watch (e.g., a calendar icon for a calendar application or an envelope icon for text or e-mail messages). For example, first information may include time, day, and/or date information which is displayed at positions 110 and 12—shown in FIGS. 1A-1B, while second information may include weather information and icons for starting messaging applications in positions 130 shown in FIGS. 1A-1B. In embodiments including objects for starting applications, information relating to the applications may be configured to be displayed at any suitable location of the display. For instance, information relating to the applications may be displayed as first information when the application is running, partially as first information 110 and partially as second information when the application is running, or entirely as second information 120 when the application is running.

To determine a change in orientation of smart watch 100, particular embodiments may include a position sensor that is operable to determine a relative orientation of the display of watch 100. The position sensor may include any suitable sensor for determining a relative orientation of the watch 100 and may, in some embodiments, include an accelerometer. The accelerometer may be housed within the body of smart watch 100, and may be operable to determine a static orientation of smart watch 100 (i.e., the current position or orientation of smart watch 100). The accelerometer may also be operable to determine a change in orientation of smart watch 100 as well as a rate of change in orientation of smart watch 100. In particular embodiments, the position sensor of smart watch 100 may include a plurality of cameras 150 which may be operable to detect the position of a face proximate to smart watch 100. Any suitable number of cameras 150 for detecting a position of a face may be used with smart watch 100. In certain embodiments, cameras 150 may be operable to view in 360° around smart watch 100. As one example, three cameras 150a, 150b, and 150c may be used with smart watch 100 as shown in FIGS. 1A-1B, each of which may be operable to view 120° of space around itself. As another example, four cameras may be used with smart watch 100, each of which may be operable to view 90° of space around itself. As yet another example, a single camera may be used with smart watch 100.

As described above, smart watch 100 may be operable to determine a change in orientation, determine a new desired position to display the first information on smart watch 100, and then move the first information to the new position as shown in FIGS. 1A-1B. This may be done through sensing a change in orientation by the position sensor described above. For example, an accelerometer incorporated within smart watch 100 may detect an initial orientation of smart watch 100 such as the relative orientation shown in FIG. 1A (relative with respect to the user's eye). The accelerometer may then determine a change in the relative orientation of smart watch 100 from the relative orientation shown in FIG. 1A to the relative orientation shown in FIG. 1B. Based on that detected change in orientation by the accelerometer, smart watch 100 may determine stop displaying the first information at position 110 as shown in FIG. 1A, and begin displaying the first information at position 120 as shown in FIG. 1B.

In some embodiments, the initial orientation, change of orientation, and subsequent determination of a new desired position to display first information may be determined through the use of cameras 150 on smart watch 100. For example, when smart watch 100 is in the orientation shown in FIG. 1A, cameras 150a and 150b may detect the presence of a user's face above the wrist and determine that the first information should be located at position 110 as shown in FIG. 1A. In this position, camera 150c will not detect the presence of the user's face. When the orientation is changed to that shown in FIG. 1B, cameras 150a and 150b may no longer detect the presence of the user's face, and camera 150c may detect the presence of the user's face. Accordingly, smart watch 100 may determine that the first information should be displayed in position 120 shown in FIG. 1B, and begin displaying the first information there. In particular embodiments, logic (e.g., software) in smart watch 100 may use facial recognition algorithms to determine that a particular user's face is proximate to smart watch 100. This may be particularly useful in the event that cameras 150 detect multiple faces proximate to smart watch 100, or in the event that an unauthorized user is using smart watch 100.

In certain embodiments, smart watch 100 may be able to turn the display on and off using facial recognition along with cameras 150. For instance, smart watch 100 may determine through readings from cameras 150 that a user is no longer looking in the direction of the watch and may accordingly turn the display off (e.g., to conserve battery resources). When a user's face is detected again by cameras 150 using facial recognition, the display may be turned back on with the first portion of the display being located in the desired position determined according to the relative orientation of smart watch 100 with respect to the user's face.

In particular embodiments, smart watch 100 may be able to detect a user's viewing angle with respect the smart watch 100 and modify the displayed information to better display the information (e.g., the first information and/or the second information described above) to the user based on the user's viewing angle. In some embodiments, the image or the text that is displayed on smart watch 100 may be adjusted for the user's viewing angle so that it may be shown as if the user is viewing the image or text flat on (such as at a viewing angle that is perpendicular to the display). Smart watch 100 may be able to determine a user's viewing angle using a position sensor incorporated in smart watch 100, such as an accelerometer or cameras. For example, referring to FIGS. 1C-1D, using camera 150c, smart watch 100 may be able to determine the location of a user's face with respect to watch. Once a viewing angle has been determined, smart watch 100 may be able to modify the displayed information in such a way that allows a user to better view the information. For instance, in the viewing position shown in FIG. 1C, information displayed perpendicular to smart watch 100 may not create the best viewing perspective for a user, and the displayed perspective angle may cause the displayed information to be skewed in the manner shown in FIG. 1C. Accordingly, in some embodiments, smart watch 100 may be operable to change the perspective angle of the displayed information away from perpendicular to smart watch 100 (which may be a default perspective) based on the user's viewing angle, such as the perspective angle shown in FIG. 1D.

Figure 2A:
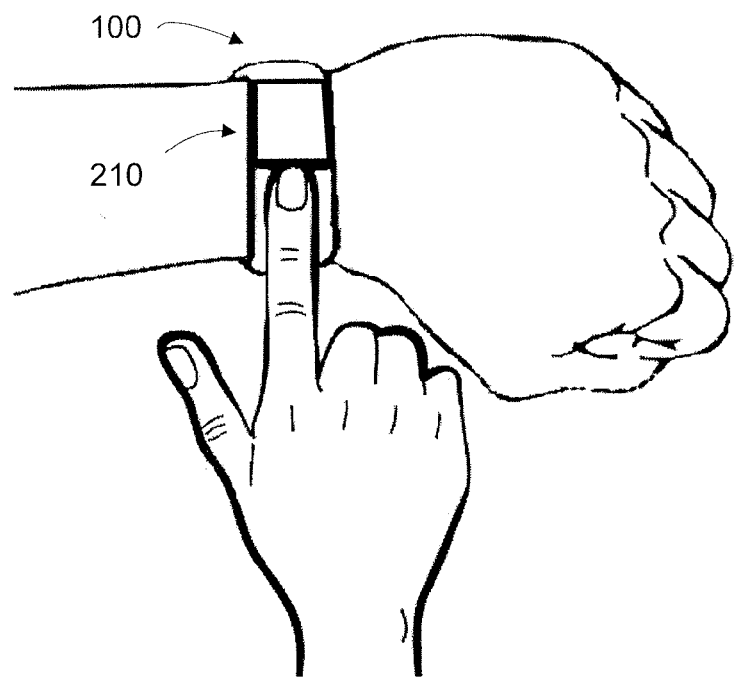
FIGS. 2A-2B illustrate an example smart watch incorporating a touch sensor according to embodiments of the present disclosure.
Figure 2B:
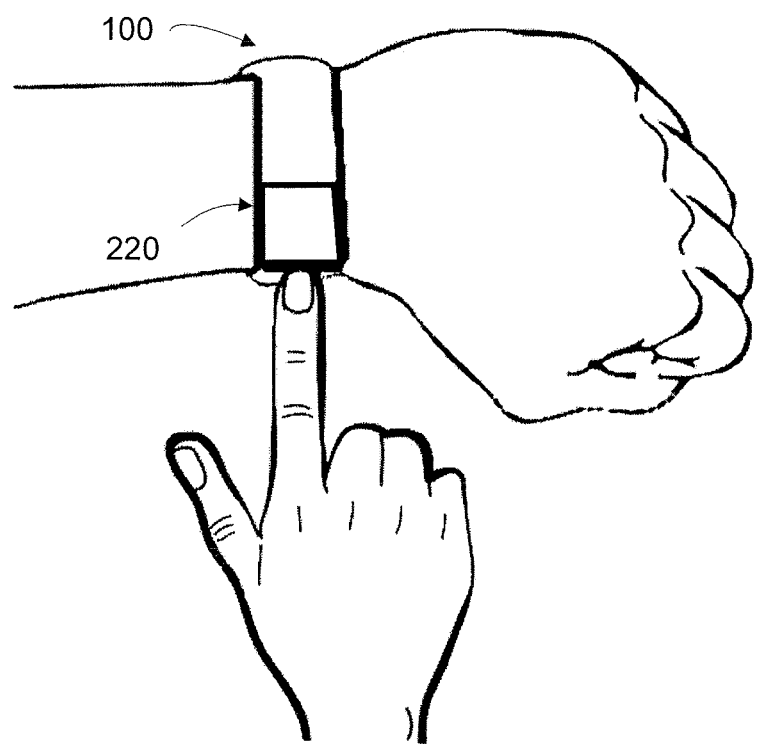

FIGS. 2A-2B illustrate an example smart watch 100 incorporating a touch sensor according to embodiments of the present disclosure. The touch sensor may be a touch sensor as described further below with respect to FIG. 4. In particular embodiments including a touch sensor, smart watch 100 may be operable to receive touch inputs from a user and modify the display accordingly. As one example, smart watch 100 may be operable to receive input from a user indicating a preferred location of first information, and may be able to display the first information at the desired location in response. This may serve, in certain embodiments, to override the automatic orientation sensing and position changing as described above with respect to FIGS. 1A-1B. As shown in FIGS. 2A-2B, a user may be able to select the first information being displayed at position 210 through touch input and move the first information to position 220. After setting the new position for displaying the first information, in some embodiments, smart watch 100 may be able to store the new location as a preferred location. The preferred location may be a location that a user prefers to have the first information displayed under particular circumstances. For example, the stored location may be used for purposes of calibrating the position sensor of smart watch 100, or may be used to indicate a preferred static location to display first portion 110 for an indefinite (e.g., overriding the automatic position sensing described above) or a limited portion of time (e.g., one minute, two minutes, or five minutes). Any other suitable touch inputs such as gestures may be detected by smart watch 100, including inputs for interacting with first information or second information displayed on smart watch 100 (e.g., providing inputs to running applications or modifying settings such as the displayed time or date), or modifying positions where the first information and/or second information is displayed on smart watch 100.

Figure 3A:
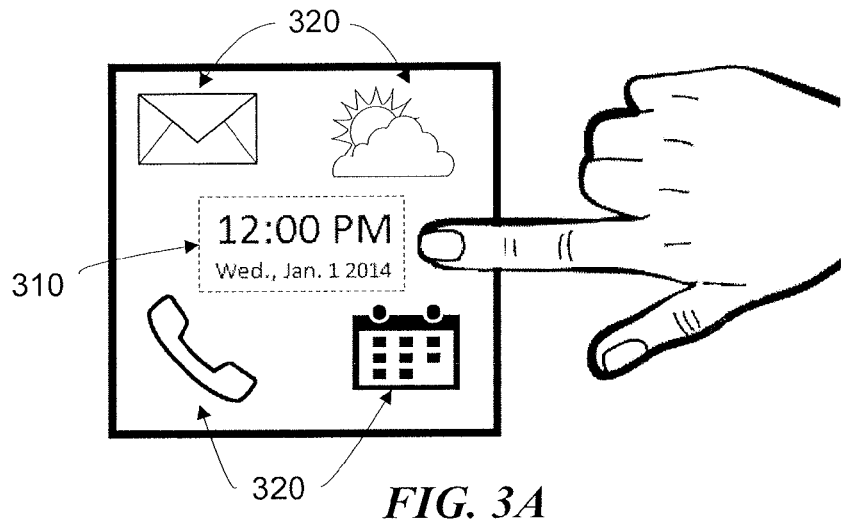
FIGS. 3A-3C illustrate example relocation and re-sizing of displayed first information and second information on smart watch according to embodiments of the present disclosure.
Figure 3B:
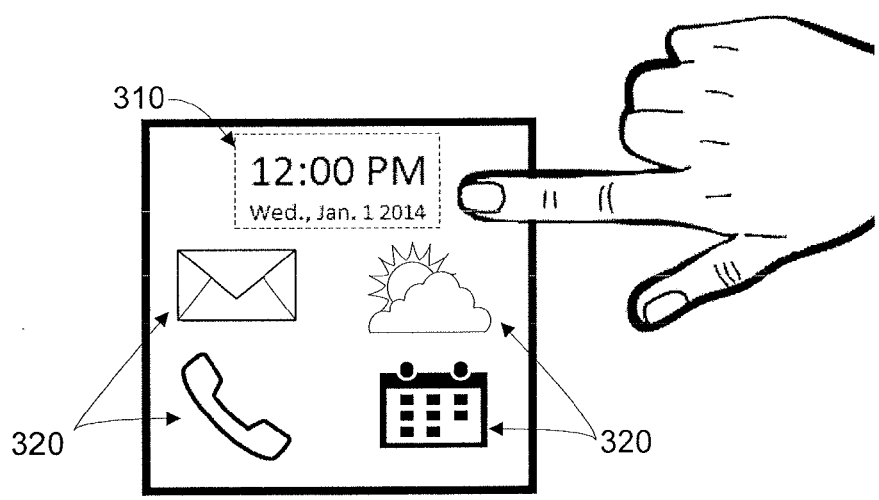
Figure 3C:
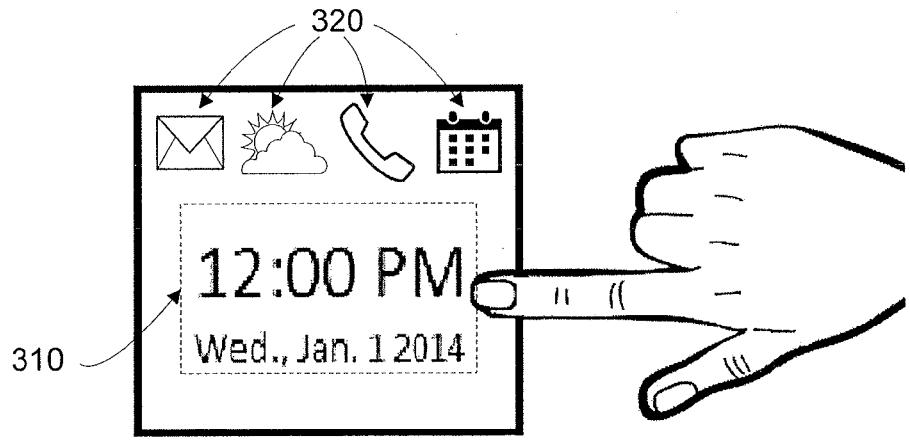

FIGS. 3A-3C illustrate example relocation and re-sizing of displayed first information and second information on smart watch 100 according to embodiments of the present disclosure. Referring to FIGS. 3A and 3B, an example re-location of objects is illustrated. Similar to the re-location of first information shown in FIGS. 2A-2B, a user may be able to select an object displayed on smart watch 100, such as object 310, and move that object to a different location on smart watch 100. When a particular object is re-located, other objects located the desired location may be re-located to accommodate for the chosen location of the moved object. For instance, as shown in FIGS. 3A-3B, as object 310 moves upward in response to touch input from the user, objects 320 may also change location to accommodate the movement of object 310. This relocation of objects is similar to the relocation of objects when the displayed first information is relocated to a new position on smart watch 100 due to changes in orientation of smart watch 100. For example, assuming object 310 represents first information and objects 320 represent second information, when object 310 is relocated upward on the display in response to a change in orientation of smart watch 100, then objects 320 may be relocated in response to the relocation of object 310.

In addition to re-location, objects 310 or 320 may be re-sized by a user as preferred. For instance, as shown in FIGS. 3B-3C, a user may select an object, such as object 310, and modify the size of that object on the display to a preferable size. For instance, assume again that object 310 represents first information and objects 320 represent second information. A user may be able to choose the preferred size of the displayed first information (i.e., object 310) to a larger or smaller size. As with the relocation of objects described above, objects 320 may be relocated in response to the re-sizing of object 310.

Figure 4:
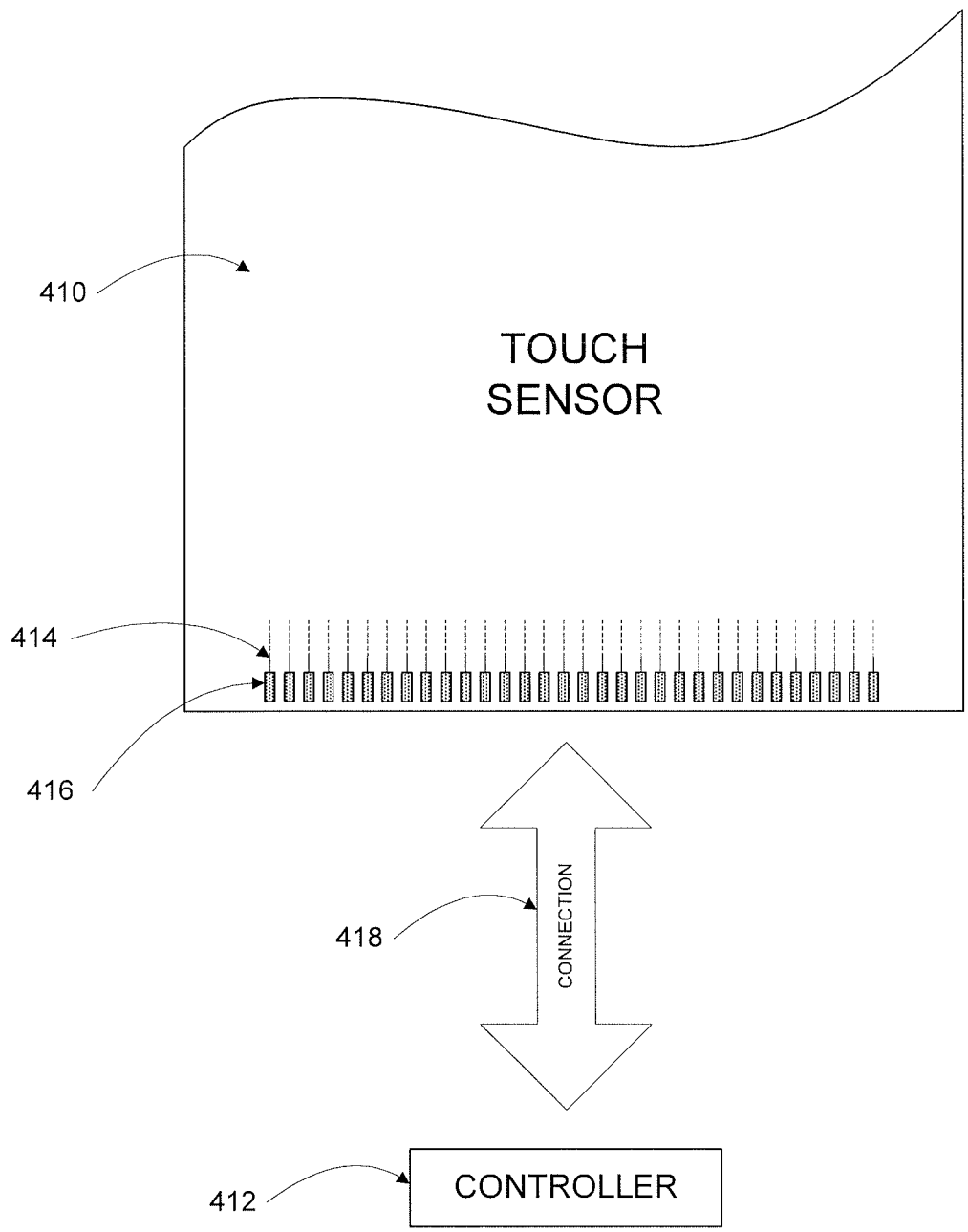
FIG. 4 illustrates an example touch sensor with an example touch-sensor controller for use with the smart watch of FIGS. 1-3 according to embodiments of the present disclosure.

FIG. 4 illustrates an example touch sensor 410 with an example touch-sensor controller 412 for use with smart watch 100 of FIGS. 1-3 according to embodiments of the present disclosure. Touch sensor 410 and touch-sensor controller 412 may detect the presence and location of a touch or the proximity of an object within a touch-sensitive area of touch sensor 410. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 410 may include one or more touch-sensitive areas, where appropriate. Touch sensor 410 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 410. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 410 and touch-sensor controller 412. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display. As another example, the mechanical stack may include the layers shown in FIGS. 2A-2B and described further below.

One or more portions of the substrate of touch sensor 410 may be made of polyethylene terephthalate (PET), glass, or another suitable material. This disclosure contemplates any suitable substrate with any suitable portions made of any suitable material. In particular embodiments, the drive or sense electrodes in touch sensor 410 may be made of ITO in whole or in part. In particular embodiments, the drive or sense electrodes in touch sensor 410 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 410 may implement a capacitive form of touch sensing. In a mutual-capacitance implementation, touch sensor 410 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 412) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 412 may measure the change in capacitance. By measuring changes in capacitance throughout the array, touch-sensor controller 412 may determine the position of the touch or proximity within the touch-sensitive area(s) of touch sensor 410.

In a self-capacitance implementation, touch sensor 410 may include an array of electrodes of a single type that may each form a capacitive node. When an object touches or comes within proximity of the capacitive node, a change in self-capacitance may occur at the capacitive node and touch-sensor controller 412 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 412 may determine the position of the touch or proximity within the touch-sensitive area(s) of touch sensor 410. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 410 may indicate a touch or proximity input at the position of the capacitive node. Touch-sensor controller 412 may detect and process the change in capacitance to determine the presence and location of the touch or proximity input. Touch-sensor controller 412 may then communicate information about the touch or proximity input to one or more other components (such one or more central processing units (CPUs)) of a device that includes touch sensor 410 and touch-sensor controller 412, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 412 may be one or more integrated circuits (ICs), such as for example general-purpose microprocessors, microcontrollers, programmable logic devices or arrays, application-specific ICs (ASICs). In particular embodiments, touch-sensor controller 412 comprises analog circuitry, digital logic, and digital non-volatile memory. In particular embodiments, touch-sensor controller 412 is disposed on a flexible printed circuit (FPC) bonded to the substrate of touch sensor 410, as described below. The FPC may be active or passive, where appropriate. In particular embodiments, multiple touch-sensor controllers 412 are disposed on the FPC. Touch-sensor controller 412 may include a processor unit, a drive unit, a sense unit, and a storage unit. The drive unit may supply drive signals to the drive electrodes of touch sensor 410. The sense unit may sense charge at the capacitive nodes of touch sensor 410 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 410. The processor unit may also track changes in the position of a touch or proximity input within the touch-sensitive area(s) of touch sensor 410. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 414 of conductive material disposed on the substrate of touch sensor 410 may couple the drive or sense electrodes of touch sensor 410 to connection pads 416, also disposed on the substrate of touch sensor 410. As described below, connection pads 416 facilitate coupling of tracks 414 to touch-sensor controller 412. Tracks 414 may extend into or around (e.g. at the edges of) the touch-sensitive area(s) of touch sensor 410. Particular tracks 414 may provide drive connections for coupling touch-sensor controller 412 to drive electrodes of touch sensor 410, through which the drive unit of touch-sensor controller 412 may supply drive signals to the drive electrodes. Other tracks 414 may provide sense connections for coupling touch-sensor controller 412 to sense electrodes of touch sensor 410, through which the sense unit of touch-sensor controller 412 may sense charge at the capacitive nodes of touch sensor 410. Tracks 414 may be made of fine lines of metal or other conductive material. As an example and not by way of limitation, the conductive material of tracks 414 may be copper or copper-based and have a width of approximately 100 μm or less. As another example, the conductive material of tracks 414 may be silver or silver-based and have a width of approximately 100 μm or less. In particular embodiments, tracks 414 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 414, touch sensor 410 may include one or more ground lines terminating at a ground connector (which may be a connection pad 416) at an edge of the substrate of touch sensor 410 (similar to tracks 414).

Connection pads 416 may be located along one or more edges of the substrate, outside the touch-sensitive area(s) of touch sensor 410. As described above, touch-sensor controller 412 may be on an FPC. Connection pads 416 may be made of the same material as tracks 414 and may be bonded to the FPC using an anisotropic conductive film (ACF). Connection 418 may include conductive lines on the FPC coupling touch-sensor controller 412 to connection pads 416, in turn coupling touch-sensor controller 412 to tracks 414 and to the drive or sense electrodes of touch sensor 410. In another embodiment, connection pads 416 may be connected to an electro-mechanical connector (such as a zero insertion force wire-to-board connector); in this embodiment, connection 418 may not need to include an FPC. This disclosure contemplates any suitable connection 418 between touch-sensor controller 412 and touch sensor 410.

Figure 5:
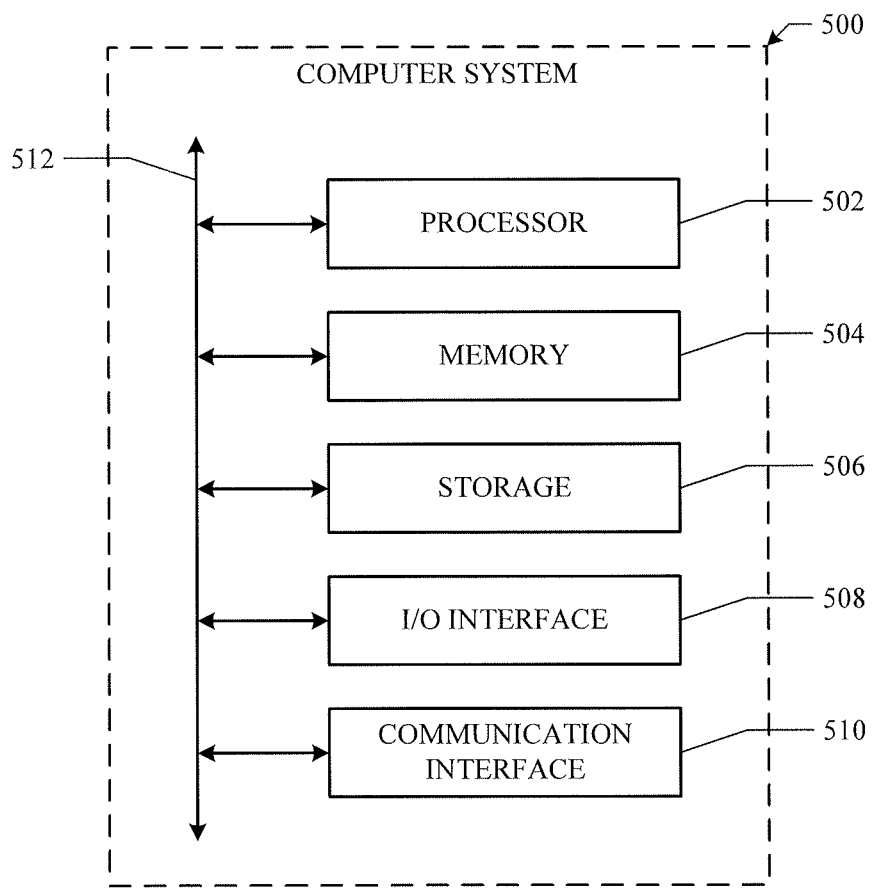
FIG. 5 illustrates an example computer system for use with the smart watch of FIGS. 1-3 according to embodiments of the present disclosure.

FIG. 5 illustrates an example computer system 500 for use with smart watch 100 of FIGS. 1-3 according to embodiments of the present disclosure. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. In particular embodiments, the software running on one or more computer systems 500 may be logic encoded on a computer readable medium. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be any suitable computer system for use with a smart watch according to embodiments of the present disclosure, including without limitation an embedded computer system, a system-on-chip (SOC), or a single-board computer system (SBC) (such as, for example, a computer-on-module (COM) or system-on-module (SOM)). Where appropriate, computer system 500 may include one or more computer systems 500. Where appropriate, one or more computer systems 500 may perform one or more steps of one or more methods described or illustrated herein (e.g., method 400 of FIG. 4). As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs).

Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes any suitable storage device for data or instructions. As an example and not by way of limitation, storage 506 may include a hard disk drive (HDD) or flash memory. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form for use with a smart watch. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage for use with a smart watch.

In particular embodiments, I/O interface 508 includes hardware, software, or both, providing one or more interfaces for communication between computer system 500 and one or more I/O devices such as touch sensor 110 or any other suitable means for communicating with smart watch 100. Computer system 500 may include one or more of these I/O devices, where appropriate. One or more of these I/O devices may enable communication between a user of smart watch 100 and computer system 500. As an example and not by way of limitation, an I/O device may include a keyboard, keypad, microphone, still camera, stylus, touch screen, video camera, or any other suitable I/O device or a combination of two or more of these. An I/O device may also include one or more sensors, such as a position sensor (e.g., an accelerometer). This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface for use with a smart watch.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
  a display;
  a position sensor configured to determine a relative orientation of the display;
  a touch sensor coupled to the display, the touch sensor comprising at least one array of electrodes of a single type that form capacitive nodes;
  a controller configured to operate the touch sensor in a self-capacitance implementation and detect touch inputs at the touch sensor; and
  one or more computer-readable non-transitory storage media embodying logic that is configured when executed to:
    display first information at a first position of the display, the first information displayed at a first viewing angle and a first perspective angle;
    display second information at a second position of the display, the second position being different from the first position;
    determine a change in orientation of the display;
    determine, in response to the change in orientation of the display, to display the first information at the second position of the display;
    determine, in response to the change in orientation of the display, a second viewing angle at which to display the first information on the display, and a second perspective angle at which to display the first information on the display;
    display the first information at the second position, the second viewing angle, and the second perspective angle; and
    display the second information at a third position of the display.

2. The system of claim 1, wherein:
  the position sensor includes an accelerometer;
  the logic of the computer-readable non-transitory storage media is further configured when executed to:
    determine a change in orientation of the display based on information from the accelerometer; and
    determine to display the first information at the second position based on the information from the accelerometer.

3. The system of claim 1, wherein:
  the position sensor includes one or more cameras; and
  the logic of the computer-readable non-transitory storage media is further configured when executed to detect, using the one or more cameras, a location of a face proximate to the display.

4. The system of claim 3, wherein the logic of the computer-readable non-transitory storage media is further configured when executed to determine to display the first information at the second position based on the detected location of the face proximate to the display.

5. The system of claim 3, wherein the logic of the computer-readable non-transitory storage media is further configured to stop displaying the first information in response to detecting that the face is not proximate to the display.

6. A method, comprising:
  displaying first information at a first position of a display, the first information displayed at a first viewing angle and a first perspective angle;
  displaying second information at a second position of the display, the second position being different from the first position;
  determining a change in orientation of the display;
  determining, in response to the change in orientation of the display, to display the first information at the second position of the display;

determining, in response to the change in orientation of the display, a second viewing angle at which to display the first information on the display, and a second perspective angle at which to display the first information on the display;

displaying the first information at the determined second position, the second viewing angle, and the second perspective angle;

displaying the second information at a third position of the display;

operating, using a controller, a touch sensor coupled to the display in a self-capacitance implementation, the touch sensor comprising an array of electrodes of a single type that form capacitive nodes; and detecting, using the controller, touch inputs at the touch sensor.

7. The method of claim 6, wherein:

determining a change in orientation of the display is based on information received from an accelerometer; and determining to display the first information at the second position is based on the information received from the accelerometer.

8. The method of claim 6, wherein determining a change in orientation of the display is based on information received from one or more cameras, the information received from the one or more cameras indicating a location of a face proximate to the display.

9. The method of claim 8, further comprising stopping the displaying of the first information in response to detecting that the face is not proximate to the display.

10. A non-transitory computer readable medium embodying logic, the logic configured when executed to:

display first information at a first position of a display, the first information displayed at a first viewing angle and a first perspective angle;

display second information at a second position of the display, the second position being different from the first position;

determine a change in orientation of the display;

determine, in response to the change in orientation of the display, to display the first information at the second position of the display;

determine, in response to the change in orientation of the display, a second viewing angle at which to display the first information on the display, and a second perspective angle at which to display the first information on the display; and display the first information at the second position, the second viewing angle, and the second perspective angle; and display the second information at a this position of the display;

operate a touch sensor coupled to the display in a self-capacitance implementation, the touch sensor comprising an array of electrodes of a single type that form capacitive nodes; and detect touch inputs at the touch sensor.

11. The computer readable medium of claim 10, wherein the logic is further configured to execute to:

determine a change in orientation of the display is based on information received from an accelerometer; and determine to display the first information at the second position based on the information received from the accelerometer.

12. The computer readable medium of claim 10, wherein the logic is further configured when executed to determine a change in orientation of the display based on information received from a one or more cameras, the information received from the one or more cameras indicating a location of a face proximate to the display.

13. The computer readable medium of claim 12, wherein the instructions are further configured to stop displaying the first information in response to detecting that the face is not proximate to the display.

\* \* \* \* \*